United States Patent [19]

Kim et al.

[11] Patent Number: 5,453,907
[45] Date of Patent: Sep. 26, 1995

[54] COMPOSITION AND METHOD FOR MAKING AN INTERGRANULAR INSULATION TYPE SEMICONDUCTIVE CERAMIC CAPACITOR

[75] Inventors: Yoon H. Kim; Byeong C. Lee, both of Seoul; Seung K. Kim, Kyungki; Tae S. Oh; Nam Kim, both of Seoul, all of Rep. of Korea

[73] Assignee: Korea Institute of Science and Technology, Seoul, Rep. of Korea

[21] Appl. No.: 67,265

[22] Filed: Dec. 24, 1992

[30] Foreign Application Priority Data

Dec. 26, 1991 [KR]  Rep. of Korea ............ 24402/1991

[51] Int. Cl.$^6$ .................................... H01G 4/12
[52] U.S. Cl. ......................... 361/321.1; 361/321.3; 501/135
[58] Field of Search ............ 361/321.4, 321.5, 361/321.1, 321.2; 501/134, 135, 136, 137, 138, 139; 427/80

[56] References Cited

U.S. PATENT DOCUMENTS

| | | | |
|---|---|---|---|
| 3,933,668 | 1/1976 | Takahashi et al. | 252/63.5 |
| 4,347,167 | 8/1982 | Payne | 252/520 |
| 4,419,310 | 12/1983 | Burn et al. | 264/59 |
| 4,839,097 | 6/1989 | Noi | 252/520 |
| 5,075,818 | 12/1991 | Ueno et al. | 361/321 |
| 5,162,298 | 11/1992 | Chaudhari | 257/33 |
| 5,266,079 | 11/1993 | Iga | 29/25.03 |

OTHER PUBLICATIONS

Study on the Semiconducting Mechanism of BaTiO$_3$ and SrTiO$_3$ Ceramics, *Ceramics International* 16, (1990) 85–88.
Microstructure of SrTiO$_3$ Boundary–Layer Capactior Material, *Journal of the American Ceramic Society*, vol 64, No. 12 (Dec. 1981).

*Primary Examiner*—Bruce A. Reynolds
*Assistant Examiner*—Michael D. Switzer
*Attorney, Agent, or Firm*—Darby & Darby

[57] ABSTRACT

A composition for an intergranular insulation type semiconductive ceramic capacitor essentially consisting of 1 mole of SrTiO$_3$, 0.005 mole to 0.012 mole of TiO$_2$, and 0.003 mole to 0.006 mole of a quinquevalent ion oxide selected from a group consisting of Nb$_2$O$_5$, Ta$_2$O$_5$, Sb$_2$O$_5$ and the mixture thereof. An intergranular insulation type semiconductive ceramic capacitor is made by sintering a ceramic body made of the composition at a temperature of not less than 1,500° C. in the atmosphere, to form a sintered body having a liquid phase at its grain boundaries, and cooling the sintered body so that the liquid phase forms an intergranular insulating layer. The intergranular insulation type semiconductive ceramic capacitor exhibits a dielectric constant of not less than 40,000 and an insulation resistance of not less than 10$^9$ Ω.

5 Claims, 2 Drawing Sheets

COMPOSITION AND METHOD FOR MAKING AN INTERGRANULAR INSULATION TYPE SEMICONDUCTIVE CERAMIC CAPACITOR

BACKGROUND OF THE INVENTION

1. Background of the Invention

The present invention relates to a composition and a method for making an intergranular insulation type semiconductive ceramic capacitor comprising an insulating layer formed at grain boundaries defined among semiconductive crystal grains with a $SrTiO_3$ based polycrystalline structure.

2. Description of the Prior Art

Such an intergranular insulation type semiconductive ceramic capacitor with a $SrTiO_3$ based polycrystalline structure conventionally uses thin grain boundaries formed among its semiconductive crystal grains as a dielectric layer and thus exhibits a high dielectric constant, as compared with general ceramic capacitors made of a $BaTiO_3$ based material. Since the ceramic capacitor is made of a material containing, as its main component, $SrTiO_3$ which is a paraelectric material, it also exhibits a low dielectric loss (tan δ) at a room temperature and an improvement over the ceramic capacitors made of the $BaTiO_3$ based material.

Such an intergranular insulation type semiconductive ceramic capacitor is manufactured by adding $Nb_2O_5$, $Dy_2O_3$, $GeO_2$ and $SiO_2$ as the secondary component to $SrTiO_3$ as the main component, to produce a mixture, sintering the mixture in a reducing atmosphere at a low partial pressure of oxygen, to produce semiconductive crystal grains, and diffusing an insulating material such as PbO, $Bi_2O_3$, $B_2O_3$ and CuO into grain boundaries defined among crystal grains, to form an intergranular insulating layer.

However, this conventional method has disadvantages in workability and cost, because of requiring complex and troublesome steps such as the sintering step performed in the reducing atmosphere and the subsequently performed diffusing step for forming the intergranular insulating layer. Furthermore, the conventional method encounters a difficulty in manufacturing capacitors having a uniform characteristic, since the characteristic of a final capacitor product is dependant upon the conditions of the reducing atmosphere and the insulating layer.

SUMMARY OF THE INVENTION

Therefore, an object of the invention is to provide a composition and a method for making an intergranular insulation type semiconductive ceramic capacitor wherein a sintered structure with an intergranular insulating layer is formed by a sintering process performed in the atmosphere, without using the sintering process performed in the reducing atmosphere and the diffusing process for forming the intergranular insulating layer.

BRIEF DESCRIPTION OF THE DRAWINGS

Other objects and aspects of the invention will become apparent from the following description of embodiments with reference to the accompanying drawings in which.

DESCRIPTION OF THE PREFERRED EMBODIMENTS

The present invention provides an intergranular insulation type semiconductive ceramic composition essentially consists of 1 mole of $SrTiO_3$, 0.005 mole to 0.012 mole of $TiO_2$, and 0.003 mole to 0.006 mole of a quinquevalent ion oxide selected from a group consisting of $Nb_2O_5$, $Ta_2O_5$, $Sb_2O_5$ and the mixture thereof.

$TiO_2$ added as a secondary component of the composition serves to make easy the formation of a liquid phase at the grain boundaries during the sintering process. On the other hand, the quinquevalent ion oxide serves to enhance the electric conductivity of crystal grains. The quinquevalent ion oxide is selected from a group consisting of $Nb_2O_5$, $Ta_2O_5$, $Sb_2O_5$ and the mixture thereof and added in an amount of 0.003 mole to 0.006 mole based on 1 mole of $SrTiO_3$.

Now, a method for making an intergranular insulation type semiconductive ceramic capacitor using the dielectric ceramic composition of the present invention will be described.

First, $SrTiO_3$ as the main component of the composition is prepared and then added with $TiO_2$ and one of $Nb_2O_5$, $Ta_2O_5$ and $Sb_2O_5$, to obtain a mixture. The mixture is subjected to a milling, to have a certain shape and then to a sintering in the atmosphere, to form a sintered body.

The sintering temperature is needed to be maintained at a proper level, since it affects the characteristic of a capacitor to be produced. It should not be less than the temperature at which a liquid phase is formed at the grain boundaries of the sintered body.

After sintering, the crystal grains of the sintered body become semiconductive. As the sintered body is cooled, the liquid phase formed at the grain boundaries is solidified to form an intergranular insulating layer.

Figure 1:
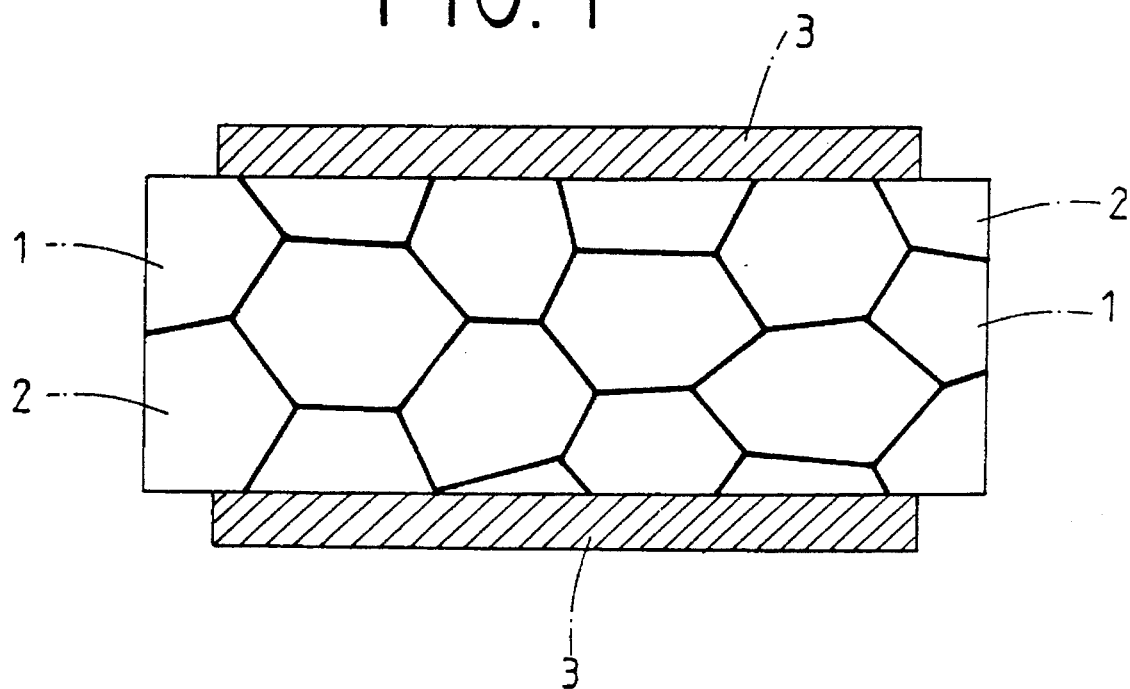
FIG. 1 is a sectional view of an intergranular insulation type semiconductive ceramic capacitor made according to a method of the present invention.

FIG. 1 is a sectional view of an intergranular insulation type semiconductive ceramic capacitor made according to the method. As shown in FIG. 1, the capacitor comprises a sintered ceramic body having semiconductive crystal grains 1 of a polycrystalline structure and an intergranular insulating layer 2 formed by the solidification of a material interposed among the semiconductive crystal grains 1 and maintained at a liquid phase upon sintering and a pair of external electrodes of a conventional structure disposed opposite surfaces of the sintered body, respectively.

In place of being formed after cooling the liquid phase formed at the grain boundaries after sintering the dielectric ceramic body in the atmosphere, the intergranular insulating layer may be formed by selectively absorbing oxygen of the atmosphere into the grain boundaries during the cooling. However, a capacitor made according to this method exhibits a dielectric constant of not more than 15,000 even at an optimum composition, so that its characteristic is considerably lower than that of the conventional ceramic capacitors made by the sintering performed at the reducing atmosphere and the diffusion of the intergranular insulating layer. As a result, the method could not be practically applied to the manufacture of intergranular insulation type semiconductive ceramic capacitors.

The intergranular insulation type semiconductive ceramic capacitor made according to the method comprising the oxygen absorption exhibits a considerably decreased insulation resistance characteristic. Accordingly, the method also encounters a problem of necessarily performing a diffusion of the intergranular insulating layer after the sintering in the atmosphere.

The optimum sintering temperature for forming the liquid phase at the grain boundaries of the dielectric ceramic body having the composition of the present invention is dependant upon the total addition amount of $TiO_2$ and one of $Nb_2O_5$, $Ta_2O_5$ and $Sb_2O_5$ as the secondary component. For example, where $TiO_2$ alone is added to $SrTiO_3$, the sintering is carried out at the temperature of 1,500° C. to 1,560° C. higher than 1,440° C., that is, the temperature at which the formation of the liquid phase is initiated.

If the sintering is carried out at a temperature lower than 1,500° C., in the above case, it is impossible to form the liquid phase in an amount sufficient to form the intergranular insulating layer after cooling the liquid phase. As a result, the characteristic of ceramic capacitor is greatly degraded.

The determination of the optimum sintering temperature in a temperature range of 1,500° C. to 1,560° C. can be possible by measuring the dielectric constant and the insulation resistance of ceramic capacitor.

On the other hand, the method of the present invention needs no diffusion of an insulating material in the grain boundaries, in that the intergranular insulation type semiconductive ceramic composition can obtain the insulation resistance of at least $10^9$ $\Omega$ after it is sintered in the atmosphere. Where an increase in insulation resistance is required in some cases, an insulating material such as PbO, $Bi_2O_3$, $B_2O_3$ or CuO may be diffused in the grain boundaries after completing the sintering in the atmosphere, so as to improve the insulation resistance.

Figure 2:
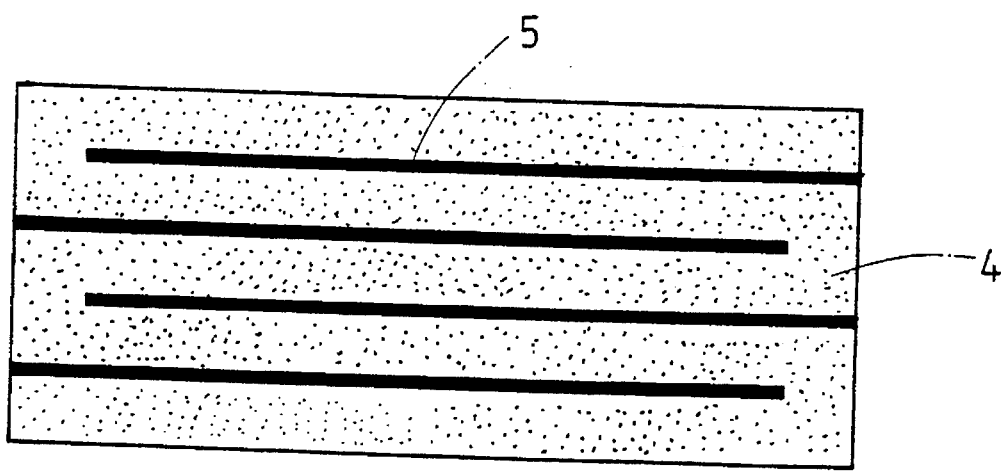
FIG. 2 is a sectional view of an intergranular insulation type semiconductive ceramic capacitor with a multi-layered structure made according to a method of the present invention.

The conventional intergranular insulation type semiconductive ceramic composition makes it impossible to manufacture a capacitor with a multi-layered structure, because of requiring the diffusion of insulating material in the grain boundaries for forming the intergranular insulating layer. However, the intergranular insulation type semiconductive ceramic composition has an advantage of enabling the manufacture of the capacitor with the multi-layered structure, as shown in FIG. 2.

Where a sintered body with a multi-layered structure shown in FIG. 2 is formed using the conventional intergranular insulation type semiconductive ceramic composition and then coated at its surface with an insulating material, so as to diffuse the insulating material in grain boundaries of the sintered body, it is impossible to achieve a uniform diffusion of the insulating material, since the insulating material can not reach the grain boundaries inwardly disposed. Furthermore, it is impossible to avoid a reaction of the insulating material with internal electrodes. As a result, the conventional composition makes it impossible to manufacture a capacitor with the multi-layered structure.

However, the intergranular insulation type semiconductive ceramic composition of the present invention needs no diffusion of insulating material in the grain boundaries, in that it can obtain the insulation resistance of at least $10^9$ $\Omega$ after it is sintered in the atmosphere. This feature makes it possible to manufacture on intergranular insulation type semiconductive ceramic capacitor with the multi-layered structure wherein internal electrodes 5 are formed in a dielectric ceramic body 4, as shown in FIG. 2.

The procedures of manufacturing the capacitor with the multi-layered structure shown in FIG. 2 by using the composition of the present invention will be now described in detail.

First, a green tape made of the intergranular insulation type semiconductive ceramic composition of the present invention is prepared. A paste of a precious metal, such as Pt or Pd is then screen-printed on the green tape. The precious metal has a melting point higher than the sintering temperature at which a liquid phase for producing an intergranular insulating layer is formed and exhibits a characteristic of avoiding an oxidation even upon the sintering in the atmosphere. Over the precious metal layer, another green tape is then layered. In this manner, a multi-layered structure is obtained which comprises alternately arranged dielectric layers (green tapes) and precious metal layers. After the multi-layered structure is sintered in the atmosphere, an intergranular insulation type semiconductive capacitor with the multi-layered structure is produced which comprises a dielectric ceramic body 4 made of the intergranular insulation type semiconductive ceramic composition of the present invention and internal electrodes 5 made of the precious metal such as Pt or Pd, as shown in FIG. 2.

Alternatively, the formation of internal electrodes of the multi-layered capacitor may be accomplished by forming another type of multi-layered structure. This multi-layered structure is obtained by printing a paste of an inflammable material such as carbon on a green tape made of the composition of the present invention, layering another green tape over the inflammable material layer, and repeating the printing and layering steps. As the multi-layered structure is sintered in the atmosphere, the inflammable material is burned and removed, so that a space layer is formed between each dielectric layer. Into the space layers, a base metal such as Pb or Sn is injected, to form internal electrodes. Thus, an intergranular insulation type semiconductive capacitor with the multi-layered structure is obtained.

The present invention will be understood more readily with reference to the following example; however this example is intended to illustrate the invention and is not to be construed to limit the scope of the present invention.

EXAMPLE

First, $SrCO_3$ and $TiO_2$ having the purity of 99% were mixed with each other and calcinated at a temperature of 1,130° C. for two hours, to produce $SrTiO_3$. Thereafter, $SrTiO_3$ was added with a secondary component including $TiO_2$ and one of $Nb_2O_5$, $Ta_2O_5$ and $Sb_2O_5$, according to the composition described in the following Table 1, to form a mixture which was, in turn, milled, to produce ceramic powder. The mixing and milling were carried out in a wet manner.

The ceramic powder was subjected to a pressure shaping for forming a disc having a thickness of 1 mm. The disc was sintered at a temperature of 1,530° C. for four hours in the atmosphere. The heating and cooling rates before and after the sintering were maintained 100° C./hr.

As another method for producing ceramic powder, 1 mole of $SrCO_3$ and 1 mole of $TiO_2$ having the purity of 99% for producing 1 mole of $SrTiO_3$ were added with the secondary component according to the composition described in Table 1 and sufficiently mixed together in a wet manner. The obtained mixture was then calcinated at a temperature of 1,130° C. for 2 hours in the atmosphere.

A silver paste was screen-printed on opposite surfaces of each sample obtained after the sintering. Each sample was then subjected to a heat treatment at a temperature of 800° C. for 10 minutes, so as to form electrodes. Thus, capacitor samples were produced. For evaluating the electric characteristics of the capacitor samples, the dielectric constant and dielectric loss (tan δ) at 1 KHz and the insulation resistance at 25 V were measured. The results are described in Table 1.

It was also found that in the compositions of the present invention, the variation rate of dielectric constant depending on the variation in temperature was desirably 10% or less.

Figure 3:
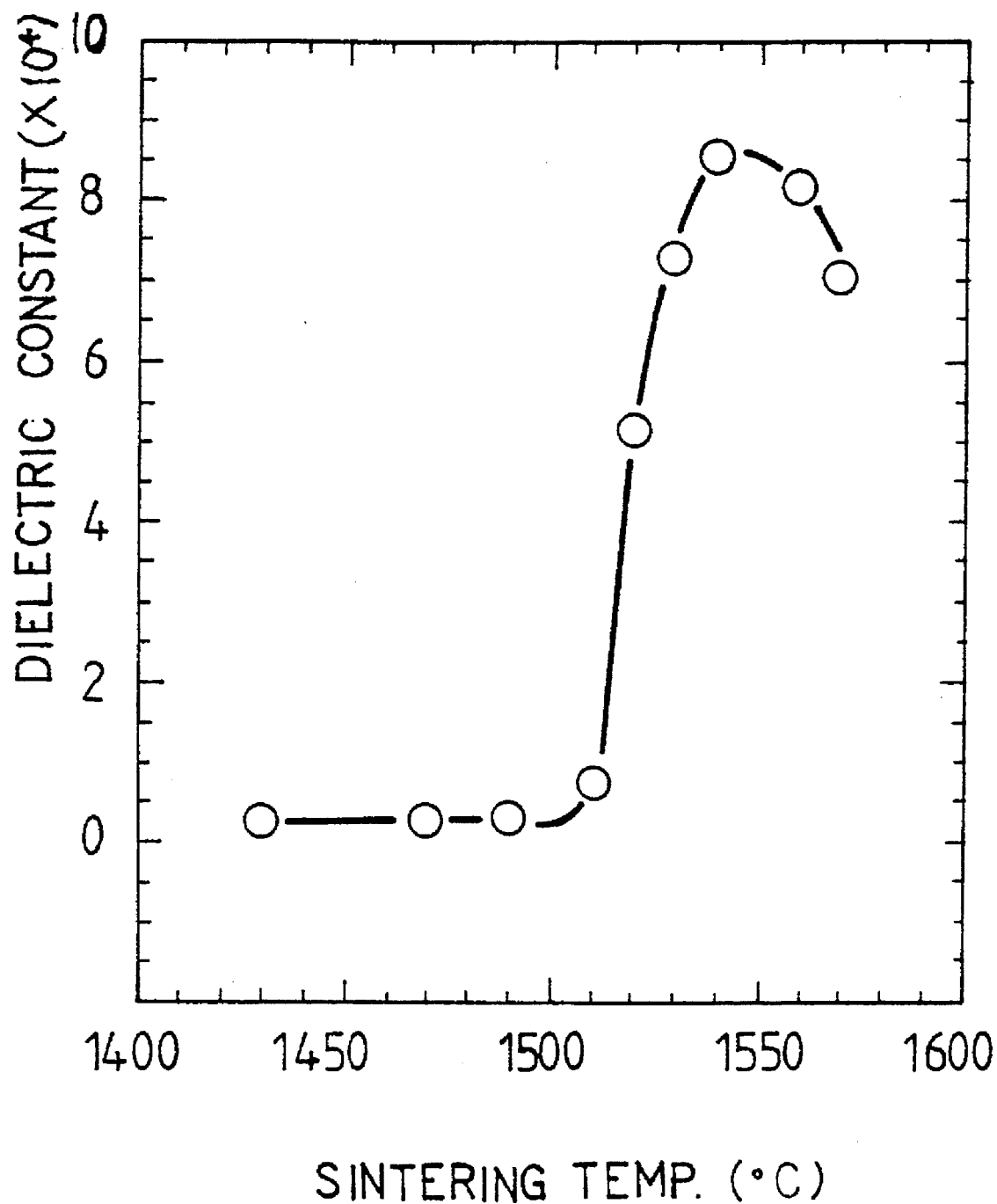
FIG. 3 is a graph depicting a variation in dielectric constant depending upon the sintering temperature in the intergranular insulation type semiconductive ceramic capacitor made according to the present invention.

FIG. 3 is a graph depicting a variation in dielectric constant depending upon the sintering temperature in case of the sample No. 2 of Table 1. From FIG. 3, it could be found that at the sintering temperature of not less than 1,520° C., a sufficient amount of liquid phase was formed at grain boundaries and the liquid phase formed an intergranular insulating layer during a cooling process performed after the

TABLE 1

Dielectric Constant and Insulation Resistance of Intergranular insulation type Semiconductive Ceramic Capacitor, Based on Composition

| Sample No. | Composition (mole) | | | | | Dielectric Constant ($\epsilon$) | Insulation Resistance (G$\Omega$) |
|---|---|---|---|---|---|---|---|
| | $SrTiO_3$ | $TiO_2$ | $Nb_2O_5$ | $Ta_2O_5$ | $Sb_2O_5$ | | |
| 1 | 1 | 0.005 | 0.004 | | | 79,000 | 2.5 |
| 2 | 1 | 0.008 | 0.004 | | | 75,000 | 3.0 |
| 3 | 1 | 0.01  | 0.004 | | | 73,000 | 4.0 |
| 4 | 1 | 0.012 | 0.004 | | | 70,000 | 3.0 |
| 5 | 1 | 0.014 | 0.004 | | | 3,000 | 3.0 |
| 6 | 1 | 0.03  | 0.004 | | | 1,000 | 10.0 |
| 7 | 1 | 0.005 | — | | | 370 | 1.5 |
| 8 | 1 | 0.005 | 0.001 | | | 370 | 1.5 |
| 9 | 1 | 0.005 | 0.002 | | | 1,500 | 1.2 |
| 10 | 1 | 0.005 | 0.003 | | | 69,000 | 1.0 |
| 11 | 1 | 0.005 | 0.004 | | | 68,000 | 1.0 |
| 12 | 1 | 0.005 | 0.005 | | | 87,000 | 1.0 |
| 13 | 1 | 0.005 | 0.006 | | | 63,000 | 1.0 |
| 14 | 1 | 0.005 | 0.008 | | | 13,000 | 0.8 |
| 15 | 1 | 0.005 | 0.02 | | | 6,000 | 0.8 |
| 16 | 1 | 0.005 | 0.1 | | | 7,500 | 0.9 |
| 17 | 1 | 0.005 | | 0.001 | | 380 | 1.5 |
| 18 | 1 | 0.005 | | 0.002 | | 6,000 | 1.5 |
| 19 | 1 | 0.005 | | 0.003 | | 53,000 | 2.1 |
| 20 | 1 | 0.005 | | 0.004 | | 70,000 | 1.0 |
| 21 | 1 | 0.005 | | 0.005 | | 60,000 | 1.0 |
| 22 | 1 | 0.005 | | 0.006 | | 53,000 | 1.0 |
| 23 | 1 | 0.005 | | 0.008 | | | |
| 24 | 1 | 0.005 | | 0.02 | | | |
| 25 | 1 | 0.005 | | | 0.001 | 500 | 0.5 |
| 26 | 1 | 0.005 | | | 0.003 | 65,000 | 1.5 |
| 27 | 1 | 0.005 | | | 0.005 | 53,000 | 1.3 |
| 28 | 1 | 0.005 | | | 0.006 | 47,000 | 1.3 |
| 29 | 1 | 0.005 | | | 0.008 | 16,000 | 0.9 |
| 30 | 1 | 0.005 | 0.001 | 0.001 | | 3,800 | 0.8 |
| 31 | 1 | 0.005 | 0.001 | 0.002 | | 60,000 | 1.0 |
| 32 | 1 | 0.005 | 0.001 | 0.003 | | 67,000 | 1.2 |
| 33 | 1 | 0.005 | 0.002 | 0.003 | | 62,000 | 1.2 |
| 34 | 1 | 0.005 | 0.003 | 0.003 | | 60,000 | 1.0 |
| 35 | 1 | 0.005 | 0.003 | 0.005 | | 20,000 | 1,1 |
| 36 | 1 | 0.005 | 0.001 | | 0.001 | 1,500 | 0.7 |
| 37 | 1 | 0.005 | 0.001 | | 0.002 | 58,000 | 1.0 |
| 38 | 1 | 0.005 | 0.001 | | 0.003 | 67,000 | 1.5 |
| 39 | 1 | 0.005 | 0.002 | | 0.003 | 65,000 | 1.2 |
| 40 | 1 | 0.005 | 0.003 | | 0.003 | 32,000 | 1.2 |
| 41 | 1 | 0.055 | 0.003 | | 0.005 | 23,000 | 1.0 |
| 42 | 1 | 0.005 | | 0.001 | 0.001 | 1,300 | 0.7 |
| 43 | 1 | 0.005 | | 0.001 | 0.002 | 47,000 | 1.0 |
| 44 | 1 | 0.005 | | 0.001 | 0.003 | 63,000 | 1.4 |
| 45 | 1 | 0.005 | | 0.002 | 0.003 | 65,000 | 1.2 |
| 46 | 1 | 0.005 | | 0.003 | 0.003 | 54,000 | 1.0 |
| 47 | 1 | 0.005 | | 0.003 | 0.005 | 15,000 | 0.6 |

From Table 1, it can be found that the intergranular insulation type semiconductive ceramic compositions according to the present invention exhibit a dielectric constant of not less than 40,000 and an insulation resistance of not less than $10^9$ Ω. These electric characteristics could not be expected in cases of compositions beyond the compositions of the present invention.

sintering, so that a dielectric constant of not less than 40,000 was obtained. At the sintering temperatures lower than 1,520° C., the formation of intergranular insulating layer from the liquid phase was incompletely achieved, thereby causing the dielectric constant to decrease greatly.

What is claimed is:

1. A composition for an intergranular insulation type semiconductive ceramic capacitor essentially consisting of 1 mole of $SrTiO_3$, 0.005 mole to 0.012 mole of $TiO_2$, and 0.003 mole to 0.006 mole of at least one quinquevalent ion oxide selected from a group consisting of $Nb_2O_5$, $Ta_2O_5$, $Sb_2O_5$ and the mixture thereof.

2. A method for making an intergranular insulation type semiconductive ceramic capacitor comprising the steps of:

preparing $SrTiO_3$ as a main component;

adding a secondary component to the main component, to produce a mixture, the secondary component essentially consisting of $TiO_2$ and 0.003 mole to 0.006 mole of at least one quinquevalent ion oxide selected from a group consisting of $Nb_2O_5$, $Ta_2O_5$, $Sb_2O_5$ and the mixture thereof;

milling the mixture, to produce ceramic powder;

pressure shaping the ceramic powder, to a ceramic body having a predetermined shape;

sintering the ceramic body at a temperature of not less than 1,500° C. in the ambient atmosphere, to form a sintered body having a liquid phase at its grain boundaries; and cooling the sintered body so that the liquid phase forms an intergranular insulating layer.

3. A method in accordance with claim 2, further comprising the step of diffusing an insulating material selected from a group consisting of PbO, $Bi_2O_3$, $B_2O_3$ and CuO in the intergranular insulating layer.

4. A method for making an intergranular insulation type semiconductive ceramic capacitor comprising the steps of:

preparing a green tape made of a composition essentially consisting of 1 mole of $SrTiO_3$, $TiO_2$ and 0.003 mole to 0.006 mole of at least one quinquevalent ion oxide selected from a group consisting of $Nb_2O_5$, $Ta_2O_5$, $Sb_2O_5$ and the mixture thereof;

screen-printing a paste of a precious metal elected from Pt and Pd on the green tape, to form a unit layered structure;

layering a plurality of unit layered structures, to form a multi-layered structure; and sintering the multi-layered structure in the ambient atmosphere.

5. A method for making an intergranular insulation type semiconductive ceramic capacitor comprising the steps of:

preparing a green tape made of a composition essentially consisting of 1 mole of $SrTiO_3$, $TiO_2$ and 0.003 mole to 0.006 mole of at least one quinquevalent ion oxide selected from a group consisting of $Nb_2O_5$, $Ta_2O_5$, $Sb_2O_5$ and the mixture thereof;

screen-printing a paste of an inflammable material on the green tape, to form a unit layered structure;

layering a plurality of unit layered structures, to form a multi-layered structure; and sintering the multi-layered structure in the ambient atmosphere such that the inflammable material is burned and removed, to form space layers; and injecting a base metal selected from a group consisting of Pb and Sn into the space layers, to form internal electrodes.

* * * * *